(12) United States Patent
Tsang et al.

(10) Patent No.: US 10,440,267 B2
(45) Date of Patent: Oct. 8, 2019

(54) SYSTEM AND METHOD FOR IMAGE STITCHING

(71) Applicant: Tower Spring Global Limited, Road Town, Tortola (VG)

(72) Inventors: Eric Kwong Hang Tsang, Hong Kong (CN); Yuntao Sun, Shanghai (CN)

(73) Assignee: Tower Spring Global Limited, Tortola (VG)

( * ) Notice: Subject to any disclaimer, the term of this patent is extended or adjusted under 35 U.S.C. 154(b) by 0 days.

(21) Appl. No.: 15/997,708

(22) Filed: Jun. 5, 2018

(65) Prior Publication Data

US 2018/0288325 A1 Oct. 4, 2018

Related U.S. Application Data

(62) Division of application No. 15/168,251, filed on May 31, 2016, now Pat. No. 10,021,299.

(51) Int. Cl.
| | |
|---|---|
| *H04N 5/232* | (2006.01) |
| *H04N 5/265* | (2006.01) |
| *H04N 13/243* | (2018.01) |
| *H04N 5/247* | (2006.01) |
| *H04N 13/239* | (2018.01) |

(52) U.S. Cl.
CPC ......... *H04N 5/23238* (2013.01); *H04N 5/265* (2013.01); *H04N 13/239* (2018.05); *H04N 13/243* (2018.05); *H04N 5/247* (2013.01)

(58) Field of Classification Search
CPC ............... H04N 13/239; H04N 13/243; H04N 5/23238; H04N 5/247; H04N 5/265
See application file for complete search history.

(56) References Cited

U.S. PATENT DOCUMENTS

| | | | | |
|---|---|---|---|---|
| 7,814,446 | B1* | 10/2010 | Grant ................... | G06F 17/5054 716/100 |
| 8,049,786 | B2* | 11/2011 | Pan ........................ | G06T 3/0018 348/218.1 |
| 2007/0014347 | A1* | 1/2007 | Prechtl ................... | H04N 5/232 375/240.01 |
| 2014/0176700 | A1* | 6/2014 | Wang .................. | H04N 5/23238 348/118 |
| 2016/0048973 | A1* | 2/2016 | Takenaka ............... | G06T 3/4038 382/199 |

OTHER PUBLICATIONS

Zhu et al., Study on Multiple Image Processing Hardware System Based on DSP, Aug. 3-6, 2014, Proceedings of 2014 IEEE International Conference on Mechatronics and Automation (Year: 2014).*

* cited by examiner

*Primary Examiner* — Francis Geroleo
(74) *Attorney, Agent, or Firm* — Eagle IP Limited; Jacqueline C. Lui (57) ABSTRACT

Digital logic circuitry includes a plurality of logic blocks and memories that execute a method to stitch images. The method includes capturing the images with a plurality of pixel sensors, providing blocks of intensity values captured by the pixel sensors to input/output (I/O) pins of the digital logic circuitry, processing the intensity values with the digital logic circuitry, and stitching the processed images into a stitched image.

6 Claims, 8 Drawing Sheets

SYSTEM AND METHOD FOR IMAGE STITCHING

FIELD OF THE INVENTION

The present invention relates to a method and system that includes a plurality of logic blocks and memories that process and stitch images.

BACKGROUND

Image stitching is a process that combines multiple images or photographs into a single view, such as a panoramic view. Image stitching is performed through computer software and is process intensive which can lead to a large consumption of processing power, delays in processing images, and consumption of a large amount of memory.

New methods and systems that execute image stitching in real time will assist in advancing technological needs and solving technological problems.

SUMMARY OF THE INVENTION

One example embodiment is a method executed by a digital logic circuitry that includes a plurality of logic blocks and memories that execute a method to stitch images. The method includes capturing the images with a plurality of pixel sensors, providing blocks of intensity values captured by the pixel sensors to input/output (I/O) pins of the digital logic circuitry, processing the intensity values with the digital logic circuitry, and stitching the processed images into a stitched image.

Other example embodiments are discussed herein.

DETAILED DESCRIPTION

Example embodiments relate to an apparatus and methods that process and stitch wide-angle images into a 360° panoramic image via a digital logic circuity.

As noted in the background, image stitching performed through computer software is slow and process intensive. Example embodiments solve this problem by providing image stitching with digital logic circuitry instead of computer software. The digital logic circuitry can execute stitching operations more quickly and with less reliance on processing from a processor and software execution. Hardware-based stitching and image processing with digital logic circuitry also enables stitching to occur in real time without lag or processing delays in still images and video.

By way of example, wide-angle lenses are finding an increasing number of applications in imaging systems due to their wide-angle properties. For example, in a security application where camera coverage of a given room is desired, use of a wide-angle lens allows the coverage to be achieved with fewer cameras, which saves cost.

Wide-angle images captured by wide-angle lenses suffer from distortion that causes portions of the image that are located at the center to appear abnormally enlarged and causes portions of the image towards the edges to appear abnormally compressed. Because of this distortion, it is desirable to remove some of the perspective distortion in a region of the image, and create a rectilinear image from the region. A rectilinear image is one where vertical, horizontal, and diagonal lines in the environment are displayed as substantially straight lines in the image. An example embodiment can solve this problem and other technical problems related to image stitching and image processing.

In one example embodiment, a wide-angle camera viewing system includes wide-angle lenses and a digital logic circuit board. Each wide-angle lens encompasses a 120-degree field of view in a horizontal direction and a 180-degree field of view in a vertical direction. The digital logic circuit board includes input/output (I/O) pins, logic blocks, and internal memories. The logic blocks store reconfigurable a mathematical calculation process to filter or transform input image data. Each of the logic blocks performs the mathematical calculation process in parallel with each other to efficiently correct distortions of the input images and stitch the corrected images to a 360° panoramic image in real time. In this manner, a user can view the stitched images on a display without lag or delay.

In one example embodiment, an imaging system includes one or more fisheye lenses and pixel sensors that convert the optical images captured by the fisheye lenses into electrical signals. The image system also includes an integrated circuit, such as a Field Programmable Gate Array (FPGA) to process the image data.

In one example embodiment, the input/output (I/O) pins of the FPGA are directly connected to the integrated circuit that includes the image sensor or the array of pixel sensors. For example, the I/O pins directly connect to the pixel sensors to obtain raw data directly from the sensors without any pre-processing by any processors, circuits, integrated circuits, or software applications. This direct connect provides a fast or expedited transform of image sensor data captured by the image sensor to the FPGA.

In one example embodiment, images from one or more image sensors are divided into blocks of data and processed in parallel as logic blocks in the FPGA. The parallel processing of these blocks of data enables increased image processing speed. This increase in processing speed is useful in image processing applications, such as real time applications where image data is preferably acted upon on a frame-by-frame basis.

Example embodiments can be utilized with a variety of different number and types of cameras. Consider an example in which it is desired to generate a 360° panoramic output image using a plurality of cameras. For example, three cameras capture images for the left eye with each camera capturing a 120-degree field of view. Another three cameras capture images for the right eye with each camera capturing a 120-degree field of view. Digital logic circuit for the left eye and digital logic circuit for the right eye process the images captured by the cameras, stitch the output images with blending data, and generate a 360° panorama output image for the left eye and a 360° panorama output image for the right eye. The two output images are then transmitted to a destination device to generate a final 3D picture of a 360° panoramic output image. As one example, the destination device is a wearable electronic device (such as head mounted display or optical mounted display), a handheld portable electronic device (such a smartphone), or another electronic device (such as a server) that assists in providing one or more users with augmented reality (AR) or virtual reality (VR) images and/or video.

Figure 1A:
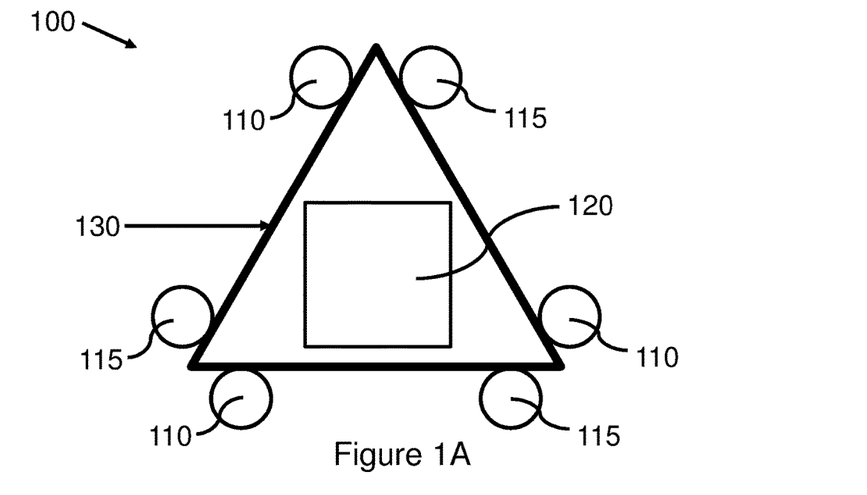
FIG. 1A shows a camera in accordance with an example embodiment.

FIG. 1A shows a camera 100 in accordance with an example embodiment. The camera 100 includes a plurality of wide-angle lenses 110 and 115 that are attached to a body or frame 130. A digital logic circuit board 120 is mechanically connected to fix to the frame 130 and electrically connected to the lenses 110 and 115.

Figure 1B:
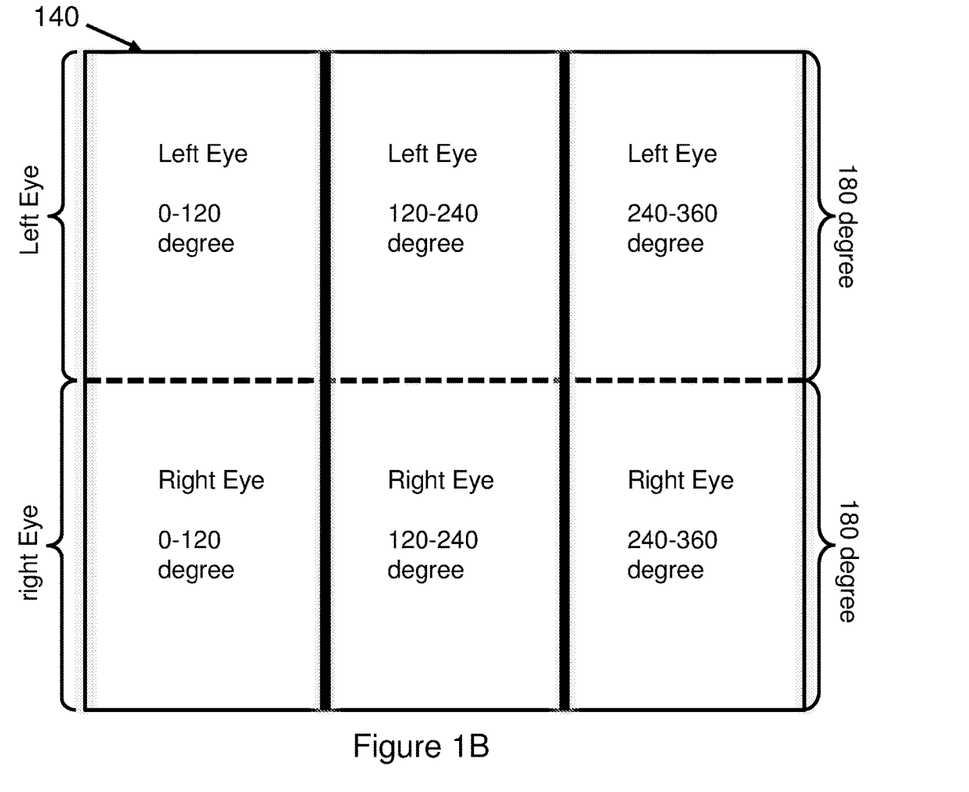
FIG. 1B shows a diagram block of an image in accordance with an example embodiment.

As one example, the wide-angle lenses 110 and 115 are fisheye lenses that output images 140 shown in FIG. 1B. In an example embodiment as shown in FIG. 1B, each fisheye lens encompasses 120-degree field of view in a horizontal direction and 180-degree field of view in a vertical direction. The wide-angle lenses 110 capture fisheye images for the right eye, and the wide-angle lenses 115 capture fisheye images for the left eye.

In FIG. 1A, the frame 130 of the camera 100 is shown with a triangular shape, but one of ordinary skill in the art upon reading this disclosure will appreciate that the frame can have other geometric shapes, such as square, rectangular, circular, polygonal, etc. Furthermore, the size, shape, make, and model of the camera can vary.

Figure 2A:
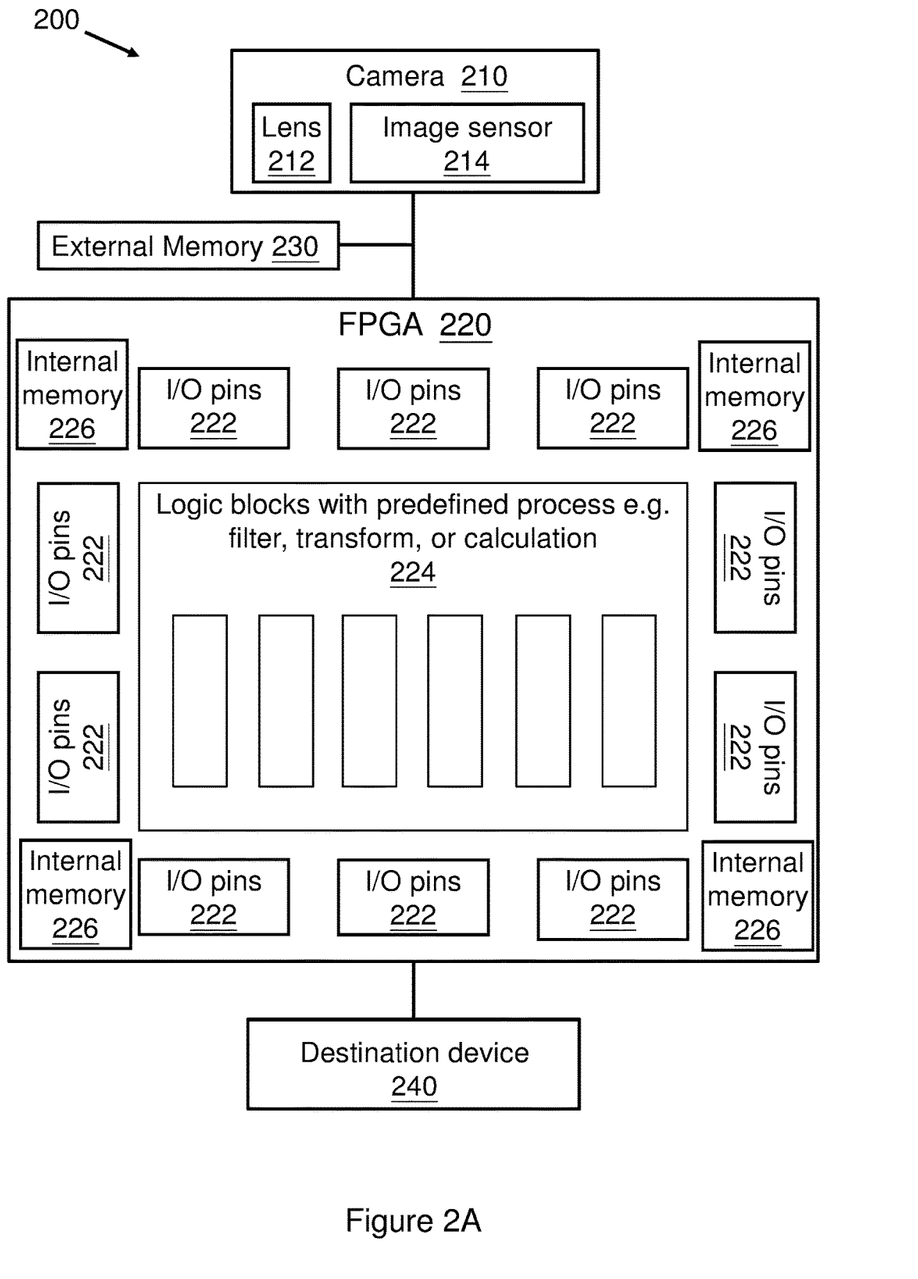
FIG. 2A shows an imaging system in accordance with an example embodiment.

FIG. 2A shows an imaging system 200 in accordance with an example embodiment. The imaging system 200 includes a camera 210, a Field Programmable Gate Array (FPGA) 220, an external memory or random access memory 230 and a destination device 240. The external memory 230 connects between the image sensor 214 and the FPGA 220.

By way of example, the image sensor is a semiconductor charge-coupled device (CCD) or an active pixel sensor, such as a complementary metal-oxide-semiconductor (CMOS) or N-type metal-oxide semiconductor (NMOS). The image sensor outputs its data to the FPGA 220 directly or via external memory 230, such as buffer memory, random access memory (RAM), double date rate synchronous dynamic random access memory (DDR SDRAM), etc.

The camera 210 includes a lens 212 and an image sensor or imaging sensor 214. The lens 212 captures optical images and is connected to the image sensor 214. The image sensor 214 converts the captured optical images into electrical data and transmits the data to the FPGA. In some instances, this data can be temporarily stored in the external memory 230. In other instances, this data transmits directly from the image sensor to the FPGA without being processed or stored in the external memory.

The FPGA 220 includes input/output (I/O) pins 222, logic blocks 224, and internal memories 226. The I/O pins are connected to the external memory 230, logic blocks 224, and internal memories 226. The logic blocks store a reconfigurable mathematical calculation process to filter or transform image data. Each of the logic blocks 224 performs the mathematical calculation process in parallel with each other to expedite processing of the image data.

As one example, the memories 226 obtain blocks of input pixel values of an input image data from the external memory 230 or directly from the image sensor 214 and save a portion of the pixel values. The logic blocks 224 calculate output pixel values based on the input pixel values and generate output images from the calculated output pixel values.

Figure 2B:
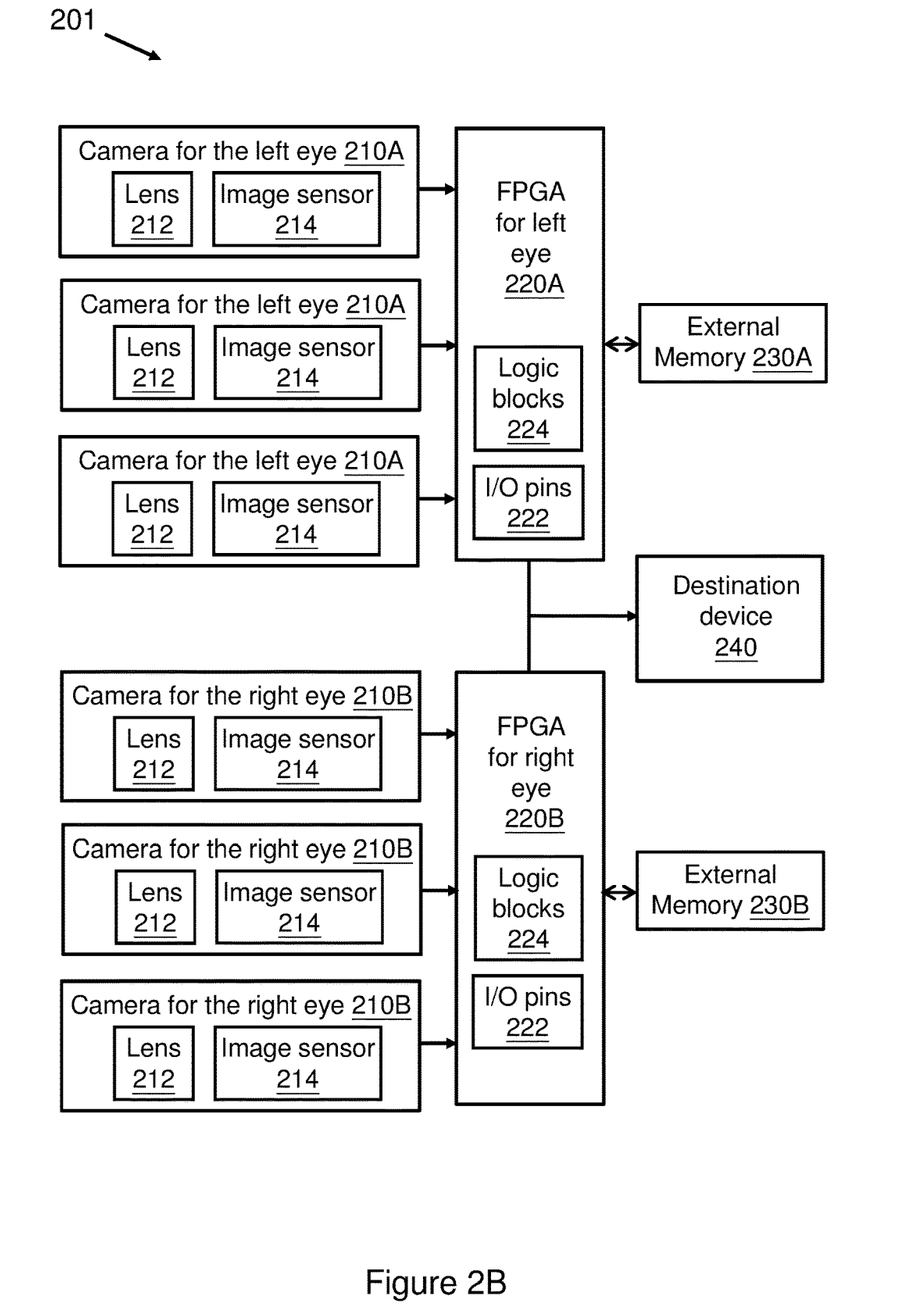
FIG. 2B shows another imaging system in accordance with an example embodiment.

FIG. 2B shows an imaging system 201 in accordance with another example embodiment. The imaging system 201 includes a plurality of cameras for the left eye 210A, a plurality of cameras for the right eye 210B, a FPGA for the left eye 220A, a FPGA for the right eye 220B, an external memory for the left eye 230A, an external memory for the right eye 230B, and a destination device 240. The external memory 230A is electrically connected to the FPGA 220A. The external memory 230B is electrically connected to the FPGA 220B.

Each of the cameras 210A or 201B includes a lens 212 and an image sensor 214. The lens 212 captures optical images and is connected to the image sensor 214. The image sensor 214 converts the captured optical images into electrical data.

The FPGA 220A or 220B includes input/output (I/O) pins 222 and logic blocks 224. The I/O pins 222 are directly connected to the image sensor 214 to obtain raw data directly from the image sensor 214 without any pre-processing by any processors, controllers, circuits, or executing software applications. The logic blocks store a reconfigurable mathematical calculation process to filter or transform the raw data obtained by the I/O pins from the image sensor. Each of the logic blocks 224 performs the mathematical calculation process in parallel with each other.

As one example, the memories 226 obtains blocks of input pixel values of an input image data from the external memory 230 and save a portion of the pixel values. The logic blocks 224 calculate output pixel values based on the input pixel values and generate output images from the calculated output pixel values.

As another example, the external memory is connected to the image sensors of the cameras as a buffer that functions as temporary storage to store the image data. The image data is read out block-by-block by the FPGA that processes each block. Each block obtained from the external memory is further divided and saved to internal memories of the FPGA. By way of example, the number of the blocks divided from the fisheye image is dependent upon the number of the logic blocks in the FPGA.

As one example, three cameras 210A capture images for the left eye with each of the cameras encompassing 120-degree field of view. Three cameras 210B capture images for the right eye with each of the cameras encompassing 120-degree field of view. The FPGA for the left eye 220A and the FPGA for the right eye 220B process the images captured by the cameras, stitch the output images with blending data, and generate a 360° panorama output image for the left eye and a 360° panorama output image for the right eye. The output image data are then transmitted to the destination device 240 for further processing, transmission, storage, display, etc.

Figure 3A:
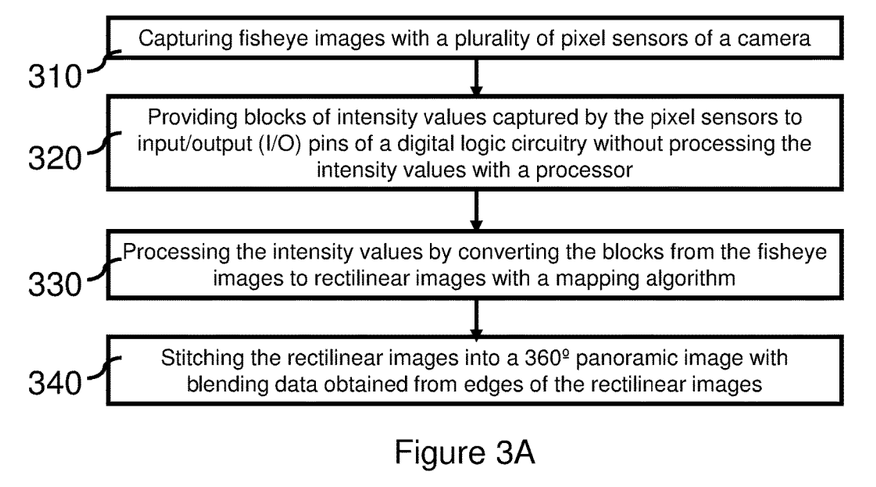
FIG. 3A shows a method to stitch fisheye images into a 360° panoramic image in accordance with an example embodiment.

FIG. 3A shows a method to stitch fisheye images into a 360° panoramic image in accordance with an example embodiment.

Block 310 states capturing fisheye images with a plurality of pixel sensors of a camera.

Consider an example in which three cameras that are each equipped with a fisheye lens. Fisheye lens is one particular type of wide-angel lens. As one example, a fisheye image captured by a fisheye lens encompasses 120-degree field of view in a horizontal direction and 180-degree field of view in a vertical direction. As yet another example, fisheye images encompass a field of view that is somewhat greater or lesser in angle.

In one example embodiment, the fisheye lens captures optical images and the pixel sensors convert the captured optical images into electrical data. As one example, each pixel sensor contains a photodetector and an active amplifier. An array of pixel sensors, together with other electric components, constitute an image sensor.

By way of example, the image sensor can be a semiconductor charge-coupled devices (CCD) sensor, complementary metal-oxide-semiconductor (CMOS) sensor, or other types of image sensors.

Block 320 states providing blocks of intensity values captured by the pixel sensors to input/output (I/O) pins of a digital logic circuitry without processing the intensity values with a processor.

Pixel data can be directly provided from the image sensor to the digital logic circuit in order to increase process execution of this data. In one example embodiment, this pixel data is not preprocessed or processed but transferred from the output pins or outputs of the image sensor directly to the digital logic circuit that performs the image stitching and other processing functions discussed herein. The image sensor and digital logic circuit can be located adjacent to each other (e.g., coupled to each on a same printed circuit board or chip) to expedite transfer of pixel data and subsequent processing of this pixel data.

Exemplary digital logic circuitry includes programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), application specific standard products (ASSPs), and application specific integrated circuits (ASICs).

As one example, the I/O pins of the digital logic circuitry are directly connected to the image sensors to directly obtain blocks of intensity values of the fisheye image or other image. There is no processor or integrated circuits placed between the sensors and the digital logic circuitry to process the intensity values of the fisheye image or other image.

By way of example, the intensity value of each is stored using an 8-bit integer giving 256 possible different grades from 0 and 255.

Block 330 states processing the intensity values by converting the blocks from the fisheye images to rectilinear images with a mapping algorithm.

In an example embodiment, the digital logic circuitry is a FPGA. The FPGA implements a series of steps to convert the fisheye images to rectilinear images by mapping pixel locations in a rectilinear image to pixel locations in a fisheye image. The pixel location is translated into a mathematical representation that is based on several parameters, such as dimensions and locations of the lenses.

As one example, the FPGA includes logic blocks connected by programmable wires. Logic blocks can be connected into circuits of arbitrary complexity by using the programmable wires to route the outputs of logic blocks to the input of others. Each logic block has one or more lookup tables (LUTs) and several bits of memory. The logic blocks can implement arbitrary logic functions or mapping algorithm.

Block 340 states stitching the rectilinear images into a 360° panoramic image with blending data obtained from edges of the rectilinear images.

As one example, the blending data are obtained on the edges of the rectilinear images and split into a plurality of groups for further processing, so as to process the large amount of data in parallel and save processing time. The intensity values of each of the groups are saved to the internal memories of the digital logic circuitry and then logic calculations are applied to coordinates of the pixels of the groups to generate the blending data for each of the groups. By way of example, the logic calculations include subtraction, summation, and multiplication.

Figure 3B:
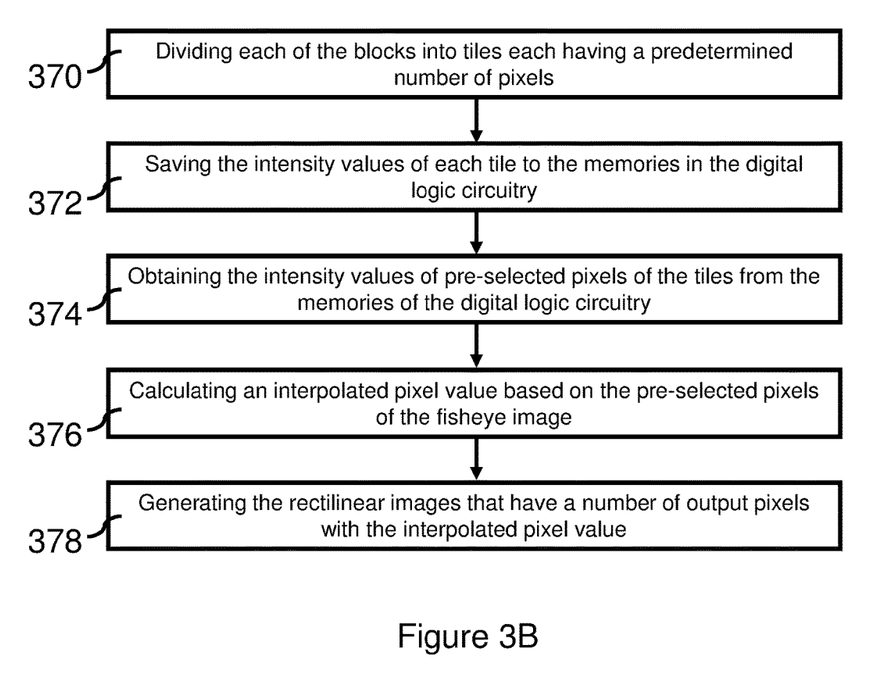
FIG. 3B shows a mapping algorithm in accordance with an example embodiment.

FIG. 3B shows a mapping algorithm in accordance with an example embodiment.

Block 370 states dividing each of the blocks into tiles each having a predetermined number of pixels.

As one example, the fisheye image is divided into blocks of intensity values and each block is further divided into a plurality of tiles. The number of pixels in each tile is predetermined and is depended, for example, on specific parameters of the digital logic circuit, such as the number of logic blocks and capacity of the internal memories of the digital logic circuit.

Block 372 states saving the intensity values of each tile to the memories in the digital logic circuitry.

As one example, the intensity values of the pixels in each tile are obtained by the I/O pins of the digital logic circuit from the sensors and saved to the internal memories of the digital logic circuit.

Block 374 and 376 state obtaining the intensity values of pre-selected pixels of the tiles from the memories of the digital logic circuitry and calculating an interpolated pixel value based on the pre-selected pixels of the fisheye image.

By way of example, some of the pixels in each tile are picked from the internal memories of the digital logic circuit and then multiplied with a coefficient matrix to generate an output pixel value. The coefficient matrix is, for example, a cubic interpolating coefficient matrix.

In one example embodiment, the output pixel value is obtained by performing a mathematical transformation represented by:

$$\text{pixel} = \sum_{i=0}^{3} \sum_{j=0}^{3} wx(i)wy(j)d_{16}(i, j)$$

where $d_{16}$ is the pixel data picked from the memories, $wx(i)$ and $wy(j)$ are interpolation coefficients that are dependent on the location of the output pixel. The location of the output pixel is represented by (ux, uy), which are relative distances to neighbor pixels.

In an example embodiment, $wx(i)$ and $wy(j)$ are decided by the following cubic interpolation functions:

$$f(0, x) = \frac{-3 \times x^3 + 6 \times x^2 - 3 \times x}{4}$$

$$f(1, x) = \frac{5 \times x^3 - 9 \times x^2 + 4}{4}$$

$$f(2, x) = \frac{-5 \times x^3 + 6 \times x^2 + 3 \times x}{4}$$

$$f(3, x) = \frac{3 \times x^3 - 3 \times x^2}{4}$$

-continued $$wx(i) = f(i, ux)$$
$$wy(i) = f(i, uy)$$

Block 378 states generating the rectilinear images that have a number of output pixels with the interpolated pixel value.

By way of example, after obtaining the interpolated output pixel values by performing the mathematical transformation for each block, an output rectilinear image can be generated for the input fisheye image.

Figure 4:
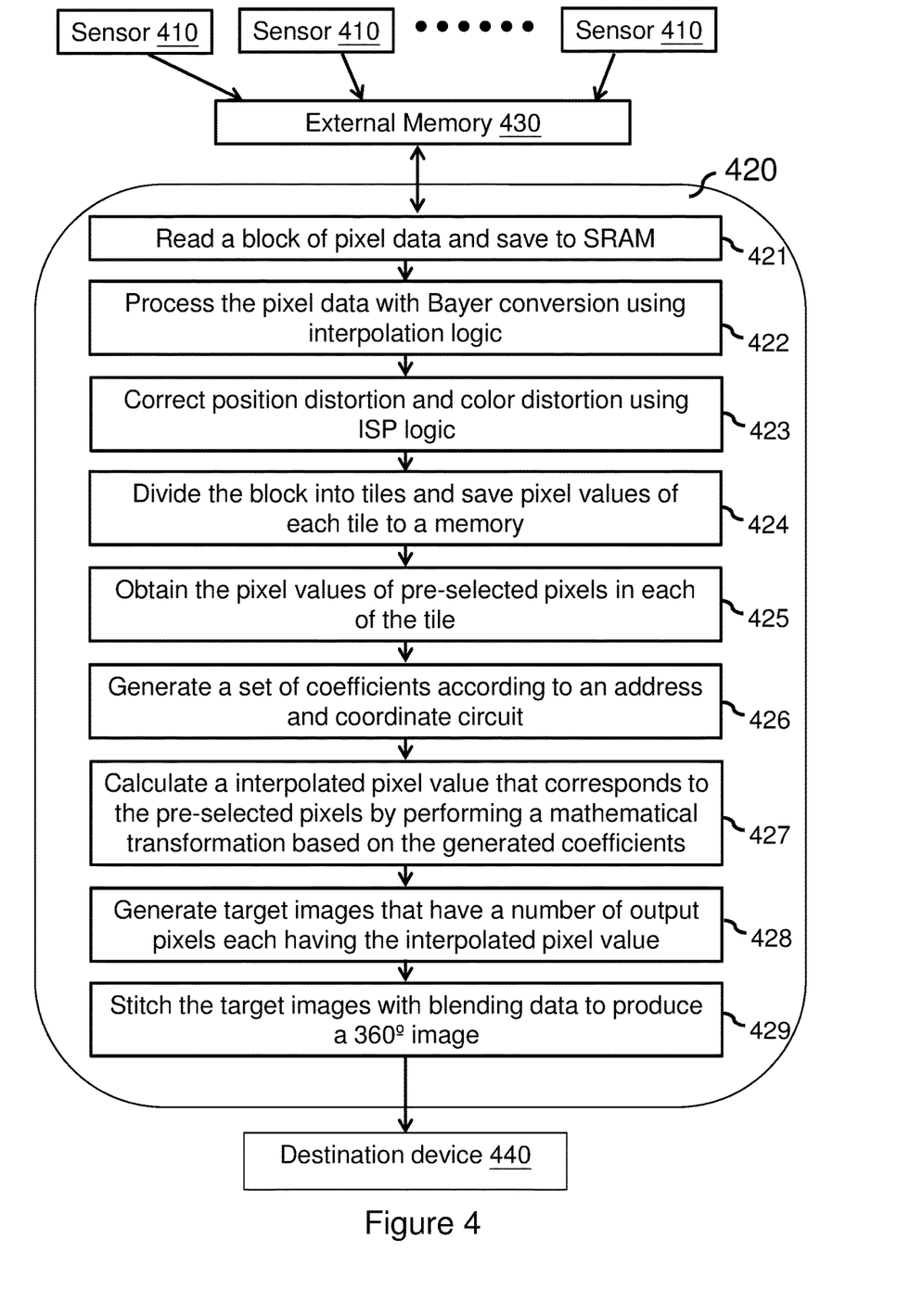
FIG. 4 shows a method to stitch fisheye images into a 360° panoramic image in accordance with another example embodiment.

FIG. 4 shows a method to stitch fisheye images into a 360° panoramic image in accordance with another example embodiment. A plurality of sensors 410 capture fisheye images and store the captured image data in an external memory 430. A digital logic circuit 420 obtains image data from the external memory, processes, and stitches the fisheye images into a 360° panoramic image.

As another example, the external memory is connected to the sensors as a buffer to store image data. The image data is divided into blocks and read out by the digital logic circuit block by block for processing. Each block that is obtained from the external memory is further divided and saved to each of the internal memories of the digital logic circuit. By way of example, the number of the blocks divided from the fisheye image is dependent upon the number of the logic blocks in the digital logic circuit.

In an example embodiment, the method executed by the digital logic circuit 420 comprises a plurality of steps.

At step 421, a block of pixel data is read from the external memory and saved to an internal memory of the digital logic circuit.

As one example, the internal memory of the digital logic circuit is a static random-access memory (SRAM). The SRAM retains data bits in its memory as long as power is being supplied.

At step 422, pixel data is processed with Bayer conversion using interpolation logic.

By way of example, the Bayer conversion filters each pixel to an intensity value at 650 nm, an intensity value at 532 nm, and an intensity value at 473 nm.

At step 423, Image Signal Processing (ISP) logic is performed to correct position distortion and color distortion for the pixels in the block.

In an example embodiment, the digital logic circuit corrects position distortion and color distortion of the input images. The position distortion includes position errors from the sensors and radial distortion from the lens of the cameras. The color distortion includes chromatic aberration from the lens of the cameras.

At step 424, the block is divided into tiles and the pixel values of each tile is saved to each SRAM.

As one example, the block is divided into tiles and the pixel intensity values of the pixels of each tile is saved to individual SRAM in order to process the large amount of data in parallel.

At steps 425-427, a number of pixels in each tile are selected and the pixel values of the pre-selected pixels in each tile are transformed by performing a mathematical transformation to calculate an interpolated pixel value based on a set of coefficients that are generated according to an address and coordinate circuit.

In an example embodiment, the logic blocks in the digital logic circuit store a reconfigurable mathematical calculation process to filter or transform data each. The logic blocks process the intensity values of the pre-selected pixels selected from each tile in parallel with each other. Logic calculations such as subtraction, summation, and multiplication are performed to the intensity values and coefficients to calculate an interpolated pixel value.

By way of example, coefficient generation is based on the parameters of the sensor and lensed such as the position of the sensors, to correct the all the distortions. If a fish-eye lens is used, the lens distortion is represented by:

$$d = f \times \theta$$

where, d is a radial distance between a pixel and an image center, f is a focal length, θ is an angle between an incident ray to an optical axis.

As one example, radial distortions, for example barrel distortion and pincushion distortion of lens can also be corrected.

In an example embodiment, distortion caused by non-ideal position or posture of the sensors in a 3D space are corrected. The 3D position coordinates of sensors and their postures can be corrected by using the following formula:

$$\begin{bmatrix} x1 \\ y1 \\ z1 \end{bmatrix} = \begin{bmatrix} m11 & m12 & m13 \\ m21 & m22 & m23 \\ m31 & m32 & m33 \end{bmatrix} \times \begin{bmatrix} x2 \\ y2 \\ z2 \end{bmatrix}$$

where [x2 y2 z2] is the ideal position of a point in 3D space, [x1 y1 z1] is the distorted position of the same point, due to distortions from sensor position and posture.

In an example embodiment, the distorted position are described by 3 parameters roll, pitch and yaw, which are rotation angles of the distorted position with respect to the ideal position in a 3D space. For example, the parameter roll is a rotation angle around the z-axis between the distorted position x'-y'-z' and the ideal position x-y-z. The coordinate transform formula is:

$$\begin{bmatrix} x' \\ y' \\ z' \end{bmatrix} = \begin{bmatrix} \cos(\text{roll}) & -\sin(\text{roll}) & 0 \\ \sin(\text{roll}) & \cos(\text{roll}) & 0 \\ 0 & 0 & 1 \end{bmatrix} \times \begin{bmatrix} x \\ y \\ z \end{bmatrix}$$

Parameters pitch and yaw can be defined in a similar way with similar coordinate transform formulas represented by:

$$\begin{bmatrix} x' \\ y' \\ z' \end{bmatrix} = \begin{bmatrix} \cos(\text{pitch}) & 0 & \sin(\text{pitch}) \\ 0 & 1 & 0 \\ -\sin(\text{pitch}) & 0 & \cos(\text{pitch}) \end{bmatrix} \times \begin{bmatrix} x \\ y \\ z \end{bmatrix} \text{ and}$$

$$\begin{bmatrix} x' \\ y' \\ z' \end{bmatrix} = \begin{bmatrix} 1 & 0 & 0 \\ 0 & \cos(\text{yaw}) & -\sin(\text{yaw}) \\ 0 & \sin(\text{yaw}) & \cos(\text{yaw}) \end{bmatrix} \times \begin{bmatrix} x \\ y \\ z \end{bmatrix}$$

As one example, the coefficient matrix is:

$$\begin{bmatrix} x1 \\ y1 \\ z1 \end{bmatrix} = \begin{bmatrix} m11 & m12 & m13 \\ m21 & m22 & m23 \\ m31 & m32 & m33 \end{bmatrix} \times \begin{bmatrix} x2 \\ y2 \\ z2 \end{bmatrix} = \begin{bmatrix} 1 & 0 & 0 \\ 0 & \cos(\text{yaw}) & -\sin(\text{yaw}) \\ 0 & \sin(\text{yaw}) & \cos(\text{yaw}) \end{bmatrix} \times$$

-continued $$\begin{bmatrix} \cos(\text{pitch}) & 0 & \sin(\text{pitch}) \\ 0 & 1 & 0 \\ -\sin(\text{pitch}) & 0 & \cos(\text{pitch}) \end{bmatrix} \times \begin{bmatrix} \cos(\text{roll}) & -\sin(\text{roll}) & 0 \\ \sin(\text{roll}) & \cos(\text{roll}) & 0 \\ 0 & 0 & 1 \end{bmatrix} \times \begin{bmatrix} x2 \\ y2 \\ z2 \end{bmatrix}$$

In an example embodiment, parameters roll, pitch and yaw depend on the relative geometric positions of the sensors or cameras in the imaging system. These parameters can be obtained in the system calibration stage.

At steps 428, target images that have a number of output pixels each having the interpolated pixel value are generated.

In an example embodiment, the interpolated pixel values are further processed to correct errors by Image Signal Processing techniques. After correction, the pixel values are converted into YUV format that include luminance and chrominance components.

At step 429, the generated target images are stitched with blending data to produce a 360° image.

As one example, three sensors capture fisheye images, each encompassing 120-degree field of view. The digital logic circuit processes the fisheye images and convert the input fisheye images to output rectilinear images. The output images are then stitched with blending data to generate a 360° output image.

As one example, the blending data are obtained on the edges of the rectilinear images and split into a plurality of groups for further processing, so as to process the large amount of data in parallel. The intensity values of each of the groups are saved to the internal memories of the digital logic circuitry and then logic calculations are applied to coordinates of the pixels of the groups to generate the blending data for each of the groups.

The output image data are then transmitted to the destination device 440 for further processing. As one example, the destination device is a headset that provide a virtual reality experience for users.

Figure 5:
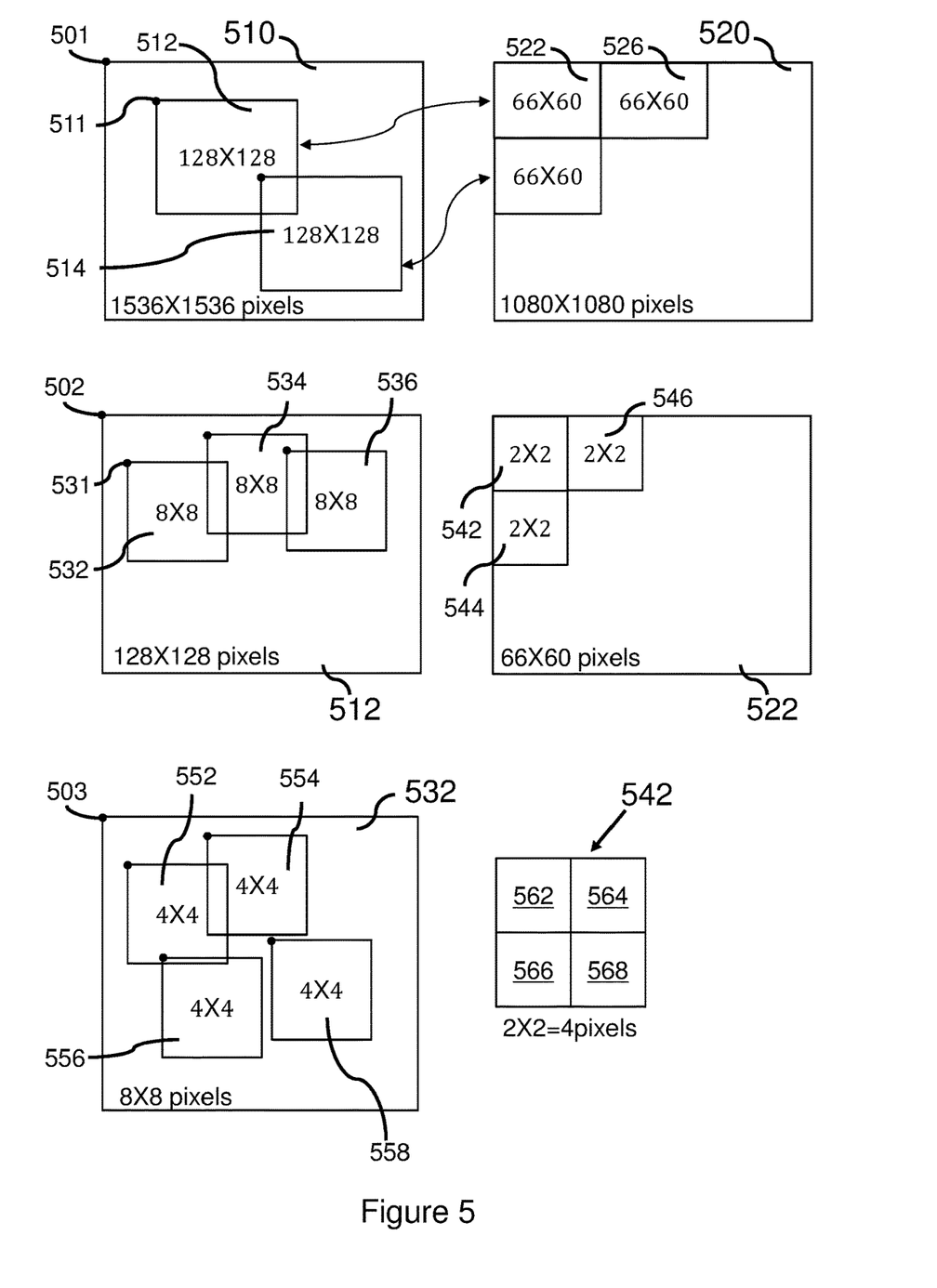
FIG. 5 shows a mapping algorithm in accordance with another example embodiment.

FIG. 5 shows a mapping algorithm in accordance with another example embodiment.

By way of example, a source image with 1536×1536 pixels is mapped to a target image with 1080×1080 pixels.

As an example, blocks 512 and 514 each with a pixel size of 128×128 are select from the source image 510. The target image 520 is generated block by block each having a pixel size of 66×60. The positions of corresponding 128×128 blocks in the source image 510 are calculated taking all the distortions into considerations.

In an example embodiment, for each target pixel in the 66×60 block with coordinates (x0, y0), the coordinates of the corresponding source pixel in the 1536×1536 source image 510 is calculated by the following steps.

First, the coordinates are converted into angles in a sphere coordinate system:

$x1 = x0/(1536/\text{HFOV})$ $y1 = y0/(1536/\text{HFOV})$ where HFOV is horizontal field of view, which is a parameter of the camera.

Second, correct the horizontal shift by using a yaw parameter by:

$x2 = x1 - \text{yaw}$ $y2 = y1$

Third, calculate the 3D position by:

$$\begin{bmatrix} x3 \\ y3 \\ z3 \end{bmatrix} = \begin{bmatrix} \cos(y2) \\ \sin(y2)\sin(x2) \\ \sin(y2)\cos(x2) \end{bmatrix}$$

Fourth, correct the pitch and roll distortions:

$$\begin{bmatrix} x4 \\ y4 \\ z4 \end{bmatrix} = \begin{bmatrix} \cos(\text{pitch}) & 0 & \sin(\text{pitch}) \\ 0 & 1 & 0 \\ -\sin(\text{pitch}) & 0 & \cos(\text{pitch}) \end{bmatrix} \times \begin{bmatrix} \cos(\text{roll}) & -\sin(\text{roll}) & 0 \\ \sin(\text{roll}) & \cos(\text{roll}) & 0 \\ 0 & 0 & 1 \end{bmatrix} \times \begin{bmatrix} x3 \\ y3 \\ z3 \end{bmatrix}$$

Fifth, convert the coordinates into an image format compatible with the specified lens:

$$\begin{bmatrix} x5 \\ y5 \end{bmatrix} = \begin{bmatrix} \dfrac{x4}{\sqrt{(x4^2 + y4^2)}} \arctan\left(\dfrac{\sqrt{(x4^2 + y4^2)}}{z4}\right) \\ \dfrac{y4}{\sqrt{(x4^2 + y4^2)}} \arctan\left(\dfrac{\sqrt{(x4^2 + y4^2)}}{z4}\right) \end{bmatrix} \times k$$

where k is a scale factor to determine the target image size.

The calculated coordinates (x5, y5) are the corresponding coordinates in the source image. As an example, there are 66×60 coordinates in the source image 510 each corresponds to a pixel in the 66×60 image block in the target image 520. The circumscribed rectangle of these 66×60 source coordinate positions is calculated.

In an example embodiment, the coordinates at the upper left corner of the rectangle is used as upper left coordinate of the 128×128 source image block. Then the corresponding 128×128 source image block can be picked out from the corresponding memory.

In another example embodiment, the 66×60 block in the target image 520 may not map with a 128×128 block in the source image 510. The 66×60 block is split into sub-blocks, and the above process is repeated for each of the sub-blocks, until all sub-blocks map to a 128×128 block in the source image 510.

As one example, block 522 in the target image 520 corresponds to block 512 in the source image 510. Point 501, which is at the upper left corner of the source image 510, is the original point with coordinates of (0, 0). Point 511, which is at the upper left corner of block 512, has coordinates of $(x_0, y_0) = (681, 54)$. The coordinates of the pixels in block 512 are in a range of $(x_0, y_0)$ to $(x_0+127, y_0+127)$.

By way of example, block 526 in the target image 520 can be processed similarly. The coordinates at the upper left corner of the corresponding 128×128 block in the source image that corresponds to block 526 in the target image is (683, 54).

By way of example, block 512 with 128×128 pixels, which is one of the 128×128 blocks in the source image 510, is mapped to block 522 with 66×60 pixels. Block 522 is further split into 990 blocks each having 2×2 pixels. For each 2×2 block in the block 522, the corresponding 8×8 block in the block 512 is identified by identifying the coordinates at the upper left corner of the 8×8 block. In an example embodiment, block 542 in the block 522 corresponds to block 532 in the block 512, and the coordinates at the upper left corner 531 of the block 532 is (64, 0).

Similarly, block 544 in the block 522 corresponds to block 534 in the block 512, and block 546 in the block 522 corresponds to block 536 in the block 512. Point 502 is the original point of the block 512.

In an example embodiment, each pixel in block 542 corresponds to one of the 4×4 blocks in block 532. Pixel 562 in the block 542 corresponds to block 552 in the block 532. Pixel 564 in the block 542 corresponds to block 544 in the block 532. Pixel 566 in the block 542 corresponds to block 556 in the block 532. Pixel 568 in the block 542 corresponds to block 558 in the block 532.

In this example, the upper left coordinates of blocks 552, 554, 556 and 558 are (2, 0), (2, 0), (0, 0) and (0, 0), respectively. Point 503 is the original point of the block 532.

By way of example, four 4×4 blocks can be picked out from the block 532. Each of the 4×4 blocks in the block 532 calculates one output pixel value in the target image. The coordinates of pixels 562, 564, 566 and 568 are (3, 8), (3, 8), (1, 9) and (1, 9), respectively. In this example, coordinates (3, 8), (3, 8), (1, 9) and (1, 9) are fixed point values. Their float point values can be obtained by dividing them by 16.

In an example embodiment, coefficients are generated based on the coordinates of the pixels in block 542 by a cubic interpolating coefficient generator. The target pixel value can be obtained by using:

$$\text{pixel} = \sum_{i=0}^{3} \sum_{j=0}^{3} wx(i) wy(j) d_{16}(i, j)$$

where $d_{16}$ is the pixel data picked from the memories, $wx(i)$ and $wy(j)$ are interpolation coefficients that are dependent on the location of the output pixel. The above formula is used for calculating the intensity values for each pixel for R/G/B channels, which include an intensity value at 650 nm, an intensity value at 532 nm, and an intensity value at 473 nm.

As one example, an intensity value of 20 at 650 nm can be obtained by substituting the following numbers to the above formula.

$$d_{16} = \begin{bmatrix} 23 & 23 & 22 & 22 \\ 24 & 22 & 21 & 21 \\ 23 & 22 & 22 & 22 \\ 23 & 23 & 23 & 23 \end{bmatrix}$$

$wx = \{-192, 1216, 1216, -192\}$ $wx = \{-227, 1676, 702, -103\}$

In an example embodiment, the above values of wx and wy are divided by 2048.

Figure 6:
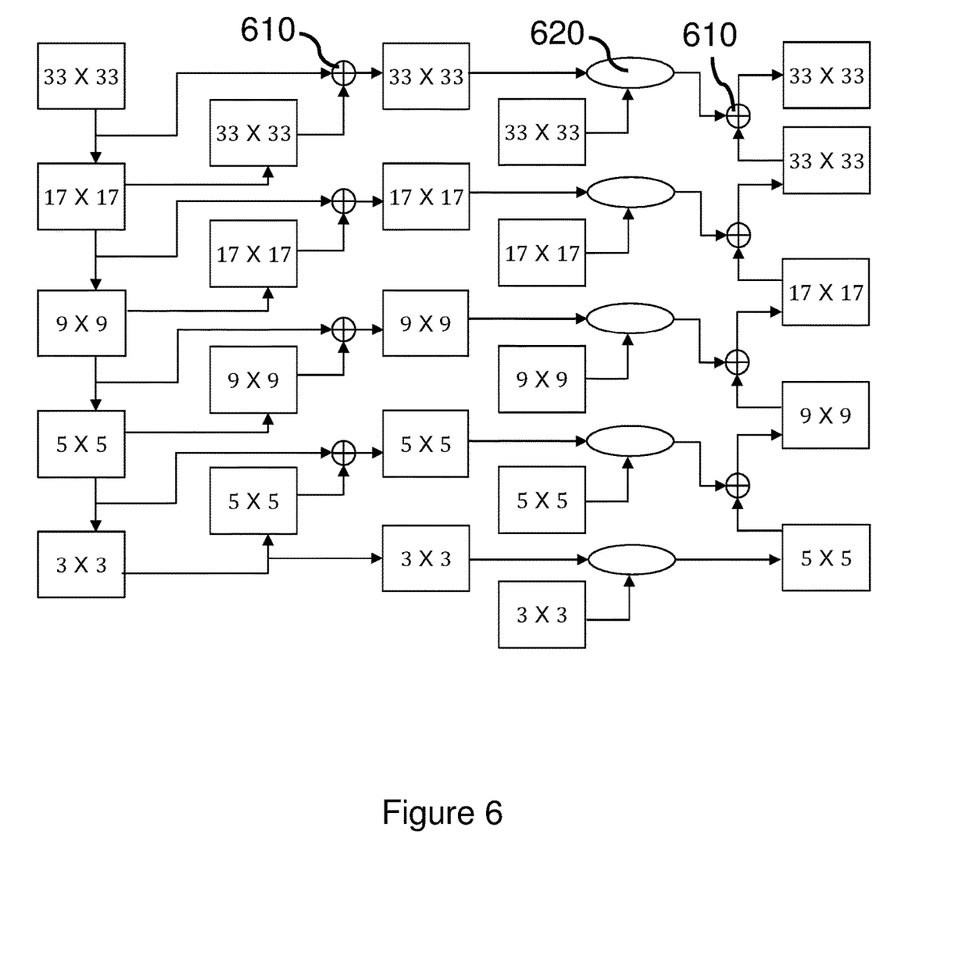
FIG. 6 shows a stitching algorithm in accordance with another example embodiment.

FIG. 6 shows a stitching algorithm in accordance with another example embodiment. Operator 610 performs multiplication and summation calculation. Operator 620 performs subtraction calculation.

As one example, blending data fill the gaps between two adjacent rectilinear images. The blending data are obtained based on intensity values of the pixels on the edges of the adjacent rectilinear images. The obtained intensity values are split into a plurality of groups for further processing in order to process the large amount of data in parallel. The intensity values of each of the groups are saved to the internal memories of the digital logic circuitry and then logic calculations are applied to coordinates of the pixels of the groups to generate the blending data for each of the groups. By way of example, the logic calculations include subtraction, summation, and multiplication.

In an example embodiment, the stitching process includes one or more of the following steps:

First, save the intensity values into a plurality of SRAMs each having a size of 33×33.

Second, perform multiplications & summations to the intensity values with coefficients from a matrix logic circuit, and save the calculation results into a SRAM of size 17×17.

As one example, the coefficients are:

$$[g(i, j)] = \begin{bmatrix} 0.0039 & 0.0156 & 0.0234 & 0.0156 & 0.0039 \\ 0.0156 & 0.0625 & 0.0938 & 0.0625 & 0.0156 \\ 0.0234 & 0.0938 & 0.1406 & 0.0938 & 0.0234 \\ 0.0156 & 0.0625 & 0.0938 & 0.0625 & 0.0156 \\ 0.0039 & 0.0156 & 0.0234 & 0.0156 & 0.0039 \end{bmatrix}$$

As one example, the multiplications & summations are:

$$y(m, n) = \sum_{i,j} x(m + i, n + j) \times g(i, j)$$

Where $x(i, j)$ is the data of block 33×33, $y(i, j)$ is decimated by a factor of 2 in both x and y directions to generate the data of 17×17.

The decimation process is represented by:

$$z(i, j) = y(2i, 2j)$$

The purpose of the filtering process is to produce low frequency component of the data.

As one example, $g(i, j)$ is:

$[g(i, j)] = [0.0625 \ 0.2500 \ 0.3750 \ 0.2500 \ 0.0625]$

As another example, $g(i, j)$ is:

$$[g(i, j)] = \begin{bmatrix} 0.625 \\ 0.2500 \\ 0.3750 \\ 0.2500 \\ 0.0625 \end{bmatrix}$$

In the above two examples, the filtered output is decimated by a factor of 2 only in x direction or y direction, not in both directions simultaneously.

Third, perform multiplications & summations to the intensity values from the previous step with coefficients from the matrix logic circuit, and save the calculation results into a SRAM of size 33×33.

Fourth, subtract the data obtained from the second and third steps from the data saved in the initial 33×33 SRAM and save the resulting data into another SRAM of the size 33×33.

Fifth, process the data in the 17×17 SRAM in a similar way, and a similar subtraction result can be saved into a SRAM of the size 17×17. In the meantime, a similar size shrinking data SRAM is used in the processing.

The above processing can be applied iteratively for many times. Finally, a subtraction result is generated and saved into a SRAM of the size 5×5 and a similar size shrinking SRAM has a size of 3×3.

As one example, the resulting data from adjacent images can be combined and a set of new data are generated, with sizes of 3×3, 5×5, 9×9, 17×17 and 33×33 in ascending order. These data are further processed by performing multiplications & summations for the 3×3 SRAM, and get another SRAM of 5×5, which is added with previously mentioned 5×5 SRAM; and performing multiplications & summations for the resulting data, and get another 9×9 SRAM.

These operations are performed iteratively until the final 33×33 SRAM data is generated and saved to a memory.

Figure 7A:
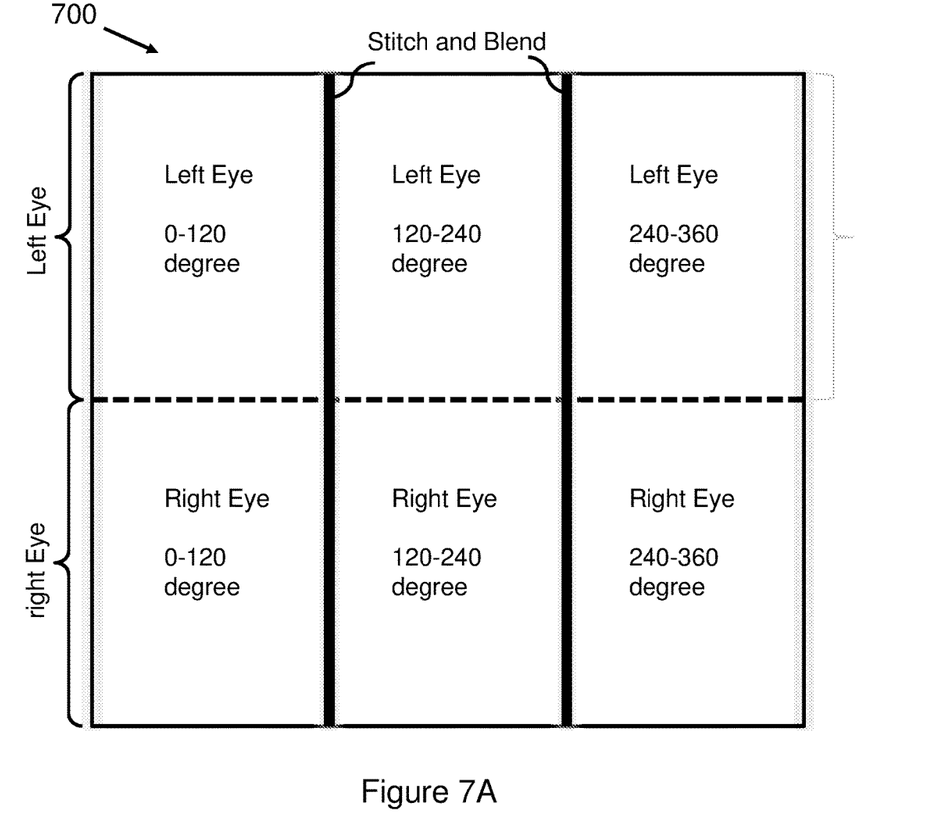
FIG. 7A shows a diagram block of an output image in accordance with an example embodiment.

FIG. 7A shows a diagram block of an output image 700 in accordance with an example embodiment.

In an example embodiment, the final image consists of view projection converted data of rectilinear images and blending data. The blending data fill the gaps between two adjacent rectilinear images. Each image encompasses 120-degree field of view in a horizontal direction and 180-degree field of view in a vertical direction.

Figure 7B:
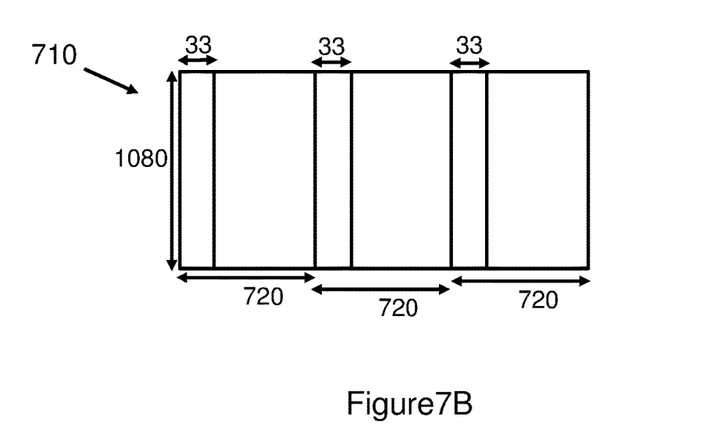
FIG. 7B shows a diagram block of an output image in accordance with another example embodiment.

FIG. 7B shows a diagram block of an output image 710 in accordance with another example embodiment.

As one example, pictures from three sensors for the left eye are transformed and stitched into a 1080×2160 size picture. Blending data with a size of 1080×33 fill the gaps tween adjacent images. Another three sensors for the right eye produce another 1080×2160 size picture. These two 1080×2160 pictures, as pictures for the left and right eye respectively, are combined to generate a final 3D picture.

In an example embodiment, three source images each with 1536×1536 pixels are mapped to three target images each with 1080×1080 pixels. The three target images are further blended and stitched to form a 1080×2160 output image.

As used herein, an "image sensor" or "imaging sensor" is a sensor that detects and conveys the information that constitutes an image.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, categories, etc.) or other specific information should be interpreted as illustrative for discussing example embodiments.

The embodiments are described with respect to digital logic circuits. The method and apparatus described herein may be incorporated into any suitable circuit. For example, the method and apparatus may also be incorporated into numerous types of devices such as microprocessors or other integrated circuits.

What is claimed is:

1. A camera, comprising:
a lens;
a plurality of image sensors that capture panoramic images;
random access memory that connects to the image sensors and stores pixel values of the panoramic images; and
a digital logic circuit having input/output (I/O) pins connected to the random access memory and including logic blocks and memories that obtain blocks of the pixel values of the panoramic images from the random access memory, save a portion of each of the blocks to each of the memories, calculate output pixel values based on pre-selected pixels in the blocks, generate output images from the calculated output pixel values, and stitch the output images with blending data to produce a 360° image,
wherein the digital logic circuit calculates the output pixel values based on a cubic interpolating coefficient generator represented by:

$$\text{pixel}(ux, uy) = \sum_{i=0}^{3} \sum_{j=0}^{3} wx(i, ux) wy(j, uy) d_{16}(i, j)$$

where $d_{16}$ are the pixel values captured by the image sensors, and $wx(i)=f(i, ux)$ and $wy(j)=f(j, uy)$ are interpolation coefficients generated by the cubic interpolating coefficient generator with the following cubic interpolation functions:

$$f(0, x) = \frac{-3 \times x^3 + 6 \times x^2 - 3 \times x}{4},$$

$$f(1, x) = \frac{5 \times x^3 - 9 \times x^2 + 4}{4},$$

$$f(2, x) = \frac{-5 \times x^3 + 6 \times x^2 + 3 \times x}{4},$$

$$f(3, x) = \frac{3 \times x^3 - 3 \times x^2}{4}.$$

2. The camera of claim 1, wherein the digital logic circuit corrects position distortion and color distortion of the panoramic images, wherein the position distortion includes position errors from the image sensors and the lens of the camera and radial distortion from the lens of the camera.

3. The camera of claim 1, wherein the blending data are generated by:
pre-selecting pixels that are at an edge of the output images;
dividing the pre-selected pixels into a plurality of groups;
saving the pixel values of each of the groups to the memories of the logic blocks of the digital logic circuit;
applying a matrix to coordinates of the pixels in the groups; and
generating, with the logic blocks of the digital logic circuit and by performing logic calculations to each of the groups, the blending data,
wherein the logic calculations include subtraction, summation, and multiplication.

4. The camera of claim 1, wherein each of the logic blocks of the digital logic circuit calculates the output pixel values for the pre-selected pixels in parallel with each other.

5. The camera of claim 1, wherein a number of the blocks of the panoramic images is dependent upon a number of the logic blocks in the digital logic circuit.

6. The camera of claim 1, wherein the digital logic circuit calculates, for each output pixel of the output images, coordinate points in the blocks of the panoramic images that correspond to the output pixel of the output image.

* * * * *